INVENTORS
MASATARO FUKUDA,
CHARLES L RULFS,
PHILIP J. ELVING

BY McLean, Morton & Boustead

ATTORNEYS.

United States Patent Office 3,470,031
Patented Sept. 30, 1969

3,470,031
PROCESS FOR THE PREPARATION OF A FUEL ELECTRODE FOR A FUEL CELL
Masataro Fukuda, Takatsuki, Osaka, Japan, and Philip J. Elving and Charles L. Rulfs, Ann Arbor, Mich., assignors to Atlantic Richfield Company, New York, N.Y., a corporation of Pennsylvania
Continuation of application Ser. No. 494,550, Oct. 11, 1965. This application Sept. 11, 1967, Ser. No. 667,005
Int. Cl. H01m 13/04, 21/00
U.S. Cl. 136—120                        6 Claims

ABSTRACT OF THE DISCLOSURE

A process for the preparation of a fuel electrode for a fuel cell comprising intimately mixing platinum oxide and silver powder in a weight ratio of from about 0.1 to 5:1, pressing the mixture between two silver screens to form an electrode body and reducing the body to a stage of reduction between about 50% and 95% relative to the stoichiometrically calculated stage wherein the theoretical value for the formation of PtH is 125.2%.

---

This application is a continuation of U.S. patent application, Ser. No. 494,550, filed Oct. 11, 1965, now abandoned.

This invention relates to improvements in systems wherein combustible fuels are oxidized and a substantial portion of the resulting energy of oxidation is converted directly, i.e., by electrochemical reaction, to electrical energy. In particular, this invention relates to the discovery of a highly efficient electrode for use in the oxidation of a fuel in a fuel cell; to fuel cells wherein such electrodes are employed; and, to a method of preparing such fuel cell electrodes.

It long has been known that electric current can be produced directly from combustible materials by electrochemical reaction. In recent years, however, research activity in this field has been greatly accelerated. The vehicle for carrying out such reactions has become known in the art as the "fuel cell." The true fuel cell differs from other primary batteries in that fuel is continuously or intermittently supplied to the cell and its electrodes are not consumed. Attention has been drawn to the fuel cell largely because of the potentially higher efficiency obtainable in the conversion of natural fuels to electrical energy by this means as compared to conventional means of power production. The theoretical efficiency of energy conversion in the fuel cell approaches 100% and operating efficiencies approaching 75% have been claimed in the literature.

Briefly stated, a fuel cell essentially comprises (1) means for containing a preselected chemical reaction of the type in which the reactants separately possess more energy than the product they form, and (2) means for capturing the "excess" energy formed by the reaction as electrical energy. The requisites of an operating fuel cell include at least one fuel electrode and one oxidizing gas electrode, an electrolyte, an oxidizing gas and a supply of a combustible fuel. In the usual type of cell, either fuel or oxidizing gas exists on one side of the respective electrode and the liquid electrolyte on the other side.

The present invention is directed to a new and improved electrode for use in fuel cells. Since fuel cells function by virtue of electrochemical oxidation of a fuel at one electrode (referred to as the anode) and electrochemical reduction of oxygen at the other electrode (referred to as the cathode), the establishment of a three phase contact among the fuel or oxidizer, the liquid electrolyte, and the solid electrode material is usual. A two-phase zone may be used where the fuel is dissolved in the electrolyte, for example. In order to function properly, therefore, the electrode must have the right kind of porosity and the correct size of pores to enable the reactants to enter the active surface and the products to diffuse out. At the same time the electrode must not allow the electrolyte to pass through it, but still the electrolyte must partially penetrate the pores. Additionally, the electrode must provide the requisite catalytic activity for the reactions and must offer a continuous conductive path for electron flow to or from the attached external circuit. Electrochemical reaction at the fuel electrode occurs where the catalyst, the electrolyte and the fuel are simultaneously exposed to each other. The rate of electrochemical reaction is vitally affected by the catalyst employed.

In general, the present invention is directed to a new type of electrode which fulfills these demanding requirements of activity, porosity, and conductivity and which consists essentially of finely divided platinum oxide and silver powder sandwiched between two silver screens and reduced to a definite stage relative to the stoichiometrically calculated stage by a reducing agent, e.g., by a definite quantity of hydrogen. The treated platinum provides activity, the silver powder provides conductive paths and porosity, and the silver screens provide structural stability as well as conductivity. The silver powder also may serve in a catalytic capacity.

The new and improved electrodes of the present invention can be prepared by intimately mixing the platinum oxide catalyst and fine silver powder and pressing the mixture between two silver screens to form a disc. The disc can then be fixed in a reducing cell and subjected to reduction, preferably with hydrogen, particularly in glacial acetic acid. Other reducing agents such as sodium formate, sodium borohydride, etc. may, however, be used if desired. The reduction of the disc is stopped at a definite stage of reduction, generally between about 50 and 95%, preferably between about 70 and 90% relative to the stoichiometrically calculated stage. The disc can, if desired, then be impregnated with a water-proofing wax solution. Sufficient electrolyte solution may then be added to keep the electrode surface covered with solution. During all of the manipulative procedures the reduced electrode is preferably protected from air.

The platinum oxide catalyst powder of the present invention can be prepared, for instance, according to the procedure of R. Adams, et al, "Organic Synthesis," Collective vol. I., 2nd ed., p. 463. Generally, the platinum oxide catalyst is present in the electrode of the present invention in a weight ratio with respect to the silver powder of from about 0.1 to 5:1, preferably about 0.25 to 1:1.

While it is contemplated that the electrodes, for most practical purposes, will have the final form of thin plates, for example, strips or discs, the invention is not so limited; and the electrodes may be of any other desirable shape, such as in the form of a curved, tubular or even cylindrical body. A preferred size and shape for the electrode is a disc approximately 12.7 mm. (½ inch) in diameter and about 1.3 mm. thick including two 33-mesh silver screens containing from 96 to 104 mg. of platinum oxide. The overall diameter and thickness of the electrode disc can vary within wide limits, as long as the electrode has sufficient mechanical strength for use in the fuel cell. The quantity of platinum oxide contained in each electrode can preferably vary from about 100 mg. to 1000 mg./cc. The mesh of the silver screens is sufficient to retain the shape of the electrode and allow the electrolyte to pass through and can advantageously vary from about 300 to 10 mesh, preferably 100 to 20 mesh.

The water-proofing wax solution used for impregnation of the electrode body can, for example, be a paraffin wax of melting point range 68–72° C. or 77–81° C. in an organic solvent therefor, such as petroleum ether, B.P.

range of 60–75° C., or methylcyclohexane. The amount of the impregnated wax in the electrode preferably can vary from about 1 to 4 weight percent.

The electrodes of this invention are suitable for use in any fuel cell employing a liquid electrolyte and a liquid or gaseous fuel. Typical of the fuels, which may be liquid or gaseous, employed in fuel cells embodying the electrodes of the present invention are hydrogen, carbon monoxide, and hydrocarbons and other oxidizable organic compounds such as methanol, methane, propane, propylene, kerosene vapors, and the like.

The electrolyte must be a medium in which ionic mobility can be achieved. A most satisfactory electrolyte is found among the hydroxides of the alkali metals such, for example, as sodium hydroxide, potassium hydroxide and the like. Also, an acid electrolyte e.g., a mineral acid such as phosphoric acid, sulfuric acid, etc., can be used as the electrolyte. Oxygen is the preferred oxidizing gas although the invention is not limited thereto. Cells of this type can be operated within a wide range of temperatures. Although it is preferred to use the electrodes with low temperature cells operating at temperatures up to about 100° C., the electrodes may also be used in intermediate temperature cells operating at temperatures from about 100° to 300° C. and in high temperature cells operating at above about 300° C.

The preparation and testing of the electrodes in accordance with the present invention will be more fully understood from the following detailed description thereof in which the examples serve to illustrate the invention with reference to the attached drawings wherein.

The present invention is principally concerned with the behavior of the fuel, or negative electrode. Therefore, only the half-cell potential of the fuel, i.e., negative, electrode versus a mercuric oxide (HgO) reference electrode containing 30% KOH solution, is measured. In testing the electrodes of the present invention, conventional electrical measurement equipment (not shown) is used. The HgO electrode is situated in the same temperature bath as the fuel cell and the experimental cell and reference electrode half-cell are kept at a constant temperature. An immersion electric heater connected to an automatic electric relay, a thermometer, an electric stirrer and a mercury thermometer were placed in a large glass jar insulated with a glass wool mat to form the bath and a 1:1 mixture of polyethylene glycol (Carbowax 400) and water was used as the bath liquid.

The positive oxidizing and negative fuel electrodes in the fuel cell were connected to small, nickel-plated copper terminals by platinum wires. Electrical circuits consisted of (a) the circuit for the fuel cell discharge and (b) the circuit for measuring and, if desired, recording the electrode potential. The former consisted of booster batteries, rheostats, a milliammeter and a voltmeter arranged to permit measurement during a constant current discharge.

PREPARATION OF ELECTRODE

The electrodes used herein below were prepared by the following general procedure:

Platinum oxide powder, $PtO_2 \cdot H_2O$, was prepared according to Adams' procedures, identified above, except that a small furnace was used instead of a Bunsen burner. Three g. of chloroplatinic acid crystals were dissolved in 10 ml. of distilled water contained in a casserole. After the addition of 25 g. of sodium nitrate crystals and sufficient blending, the wetted crystals were dried in an oven. The casserole was heated to 550° C. according to Adams' temperature-time curve. After cooling, the sodium nitrate was dissolved in 50 ml. of distilled water, resulting in the precipitation as a brown powder of platinum oxide. The oxide was washed twice by decantation on a filter paper with a small amount of distilled water. Washing was stopped when a small amount of greenish colloidal powder was found in the filtrate (pH was nearly 6). The powder was dried overnight in a desiccator containing fresh Drierite. Electrolytically prepared silver powder and a precipitated silver powder were then intimately mixed with the platinum oxide powder after being ground in an agate mortar in a weight ratio of 1:2 platinum oxide powder to silver powder.

Figure 1:
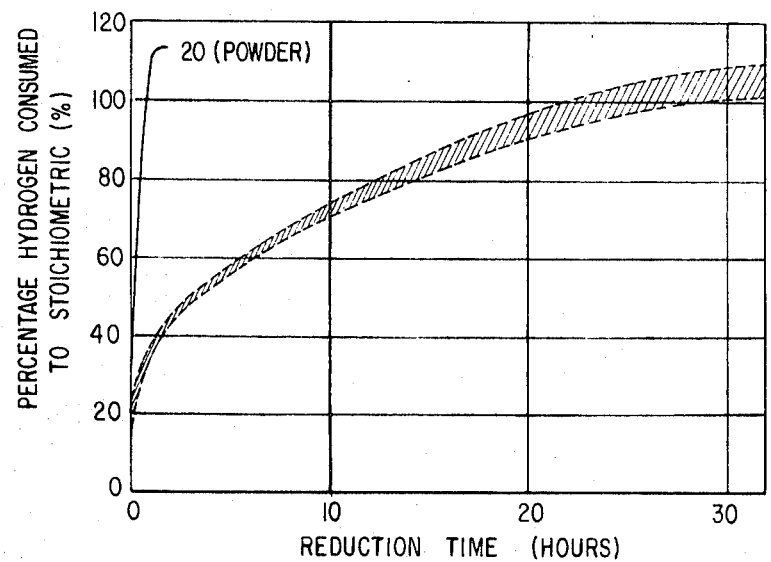
FIGURE 1 is a graph of electrode reduction time versus percent of reduction referred to stoichiometrically calculated stage.

Electrode discs 12.7 mm. (0.5 inch) in diameter and about 1.3 mm. thick (including two 33-mesh silver screens) were formed from about 360 mg. of the mixed powders under a pressure of about 60 p.s.i. The quantity of platinum oxide contained in each electrode disc was in the range of 96 to 104 mg. The disc surfaces were brushed and the discs fixed at the bottom of a reducing cell and reduced by shaking with reagent grade glacial acetic acid in the presence of hydrogen. The reduction was stopped at a point where the percentage or ratio of the amount of hydrogen consumed (due presumably to reduction and/or adsorption) to the stoichiometric amount reached some predetermined definite value, e.g., 90%. Corrections were made in the calculation of these percentages to take into account the solubility of hydrogen in glacial acetic acid at the temperature involved. The relation between the percentage hydrogen consumed and the shaking time, is shown in FIGURE 1. As is evident from this figure, reduction of the powdered oxide proceeded quite rapidly, the hydrogen consumption approaching a steady value of about 113% (the theoretical value for the formation of PtH would be 125.2%). Reduction of the oxide contained in an electrode disc fixed in the cell, however, was very slow, a steady value of about 115% being only reached after 47 hours. In the examples hereinbelow, the reduction was stopped at points within the range of 50 to 95%. The reduction can also be accomplished with sodium formate and sodium borohydride instead of hydrogen.

EXAMPLES I–IX

To illustrate the effectiveness of the present invention, electrodes prepared according to the above procedure and reduced varying amounts were tested. The degree of electrode reduction is given in Table I below. The temperature bath was kept at 50° C. All of the prepared electrodes were flushed with helium for 20 min. after contact between electrode and electrolyte was made, during which period their open circuit potentials were observed. The potentials are the fuel half-cell potential measured against an HgO reference electrode in a KOH electrolyte. As seen in Table I these potentials were in the range of —0.2 to —0.8 v. No clear relation was found between the potentials and the degree of electrode reduction, although the surface protection from exposure to air was relatively effective by comparison with the previous electrode preparation procedures. Strictly speaking, it would be necessary that a cell containing a reduced electrode be inserted into a discharge cell in an oxygen-free helium atmosphere. The time necessary for the cell transfer from the reduction apparatus to the fuel cell location was less than 5 seconds; helium was passed through the electrode during the transfer.

After the 20 min. helium flushing the electrodes were flushed with propylene, as indicated in Table I, while the variations of their open-circuit potentials were observed. The potentials are recorded in Table I, and graphically shown in FIGURE 2.

During propylene flushing a significantly increasing potential was observed. The potential increased either quite rapidly (for the 95% reduced electrode) or after a certain period of time (for the 90, 71 and 50% reduced electrodes). A flushing method found to be helpful for controlling the gas-flushing effect, and used in Example IV (90% reduced electrode), comprised contacting the electrode and electrolyte only at the times of potential measurement, (i.e., at approximately every 10 minutes; measurement was actually made within 5 seconds after contact). After the potential reached a steady value with this technique, the electrode was flushed until the potential reached a new steady value under continuous contact. In Example II, for example, after reaching a steady potential of −0.79 v. by flushing under intermittent contact, the potential decreased to −0.73 v. when flushed with continuous contact for 1 hour. This phenomenon was independent of the presence of the oxygen counter electrode in the fuel cell. On the other hand, in Example IX, using a 93% reduced electrode, a test of the electrode pre-saturated with hydrogen resulted in a slow potential decrease during propylene flushing, which approached a steady value of −0.80 v.

Summarizing these results, the initial period of the increased potential phenomenon caused by propylene flushing appears related to the original degree of reduction attained during electrode preparation: the higher the degree of reduction, the higher the steady potential (−0.807 v. for the 95% reduced electrode, −0.76 v. for 90%, −0.726 v. for 50%). The highest steady potential reached with propylene was approximately the same as that of the lowest steady potential when the hydrogen-saturated electrode was flushed with propylene.

The electrodes, after subjection to discharge tests in propylene, were flushed with hydrogen until their potential reached a limiting (highest) steady value. The results are tabulated in Table I. Though the values are much affected by the electrode's history, e.g., flushing time with propylene, degree of discharge, wet condition, etc., they are indicative of the activities of the electrodes at the end of the experiments. It is evident that the 90% or 95% reduced electrodes (−0.934 v. and −0.930 v. for hydrogen) were more active than the 50% or 71% reduced ones (−0.905 v. and −0.892 v. for hydrogen).

The electrodes were subjected for 1 hour to 0.8 ma. discharges while under a propylene atmosphere at 80° C. as follows: (a) Example III, after 1 hour propylene flushing; (b) Examples I, II, IV and VII, after several hours of propylene flushing; (c) Example IX, after hydrogen and propylene flushing which resulted in a steady potential; (d) Example V, for 6.7 hours after 20 min. propylene flushing; (e) Example VI, for 6.7 hours about 5 hours propylene flushing, which resulted in a potential increase; and (f) Example VIII, for 35 hours after about 7 hours propylene flushing.

Figure 2:
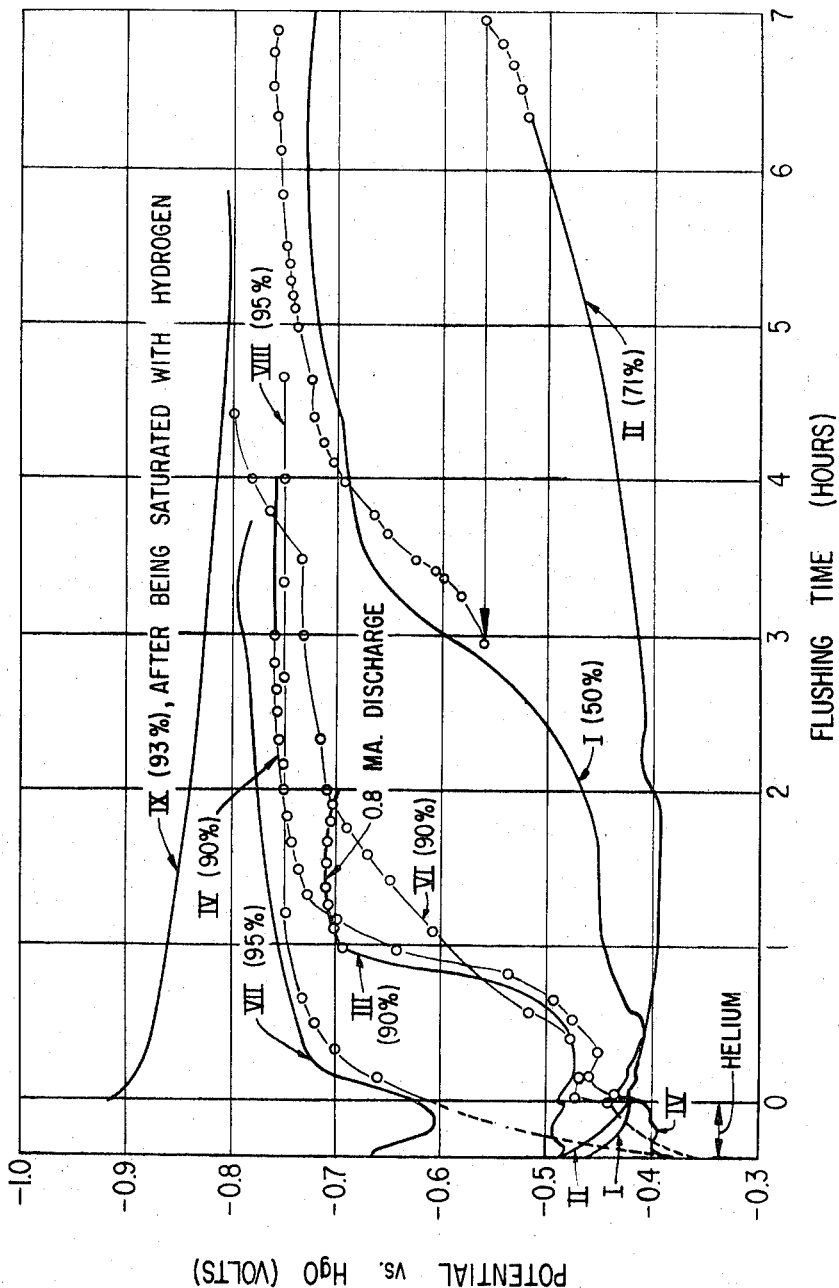
FIGURE 2 is a graph of flushing time versus potential of the prepared electrode versus an HgO reference electrode.

The discharge behaviors observed are summarized in Table I and FIGURE 2. With the 1 hour discharge in the case of (a), the potential was nearly constant at −0.7 v. In the case of (b), the potential gradually decreased. The potential in the case of (c) seemed to hold at near −0.7 v. after an initial rapid decrease from −0.8 v.

In regard to the longer discharge times, the potential in the case of (d) decreased markedly after reaching a maximum potential (−0.61 v.) and then held at near −0.3 v. In case (e), a sharp initial decrease for about 4 hours, and subsequent constancy for about 3 hours as in the case of (d) were observed. However, in case (f) the potential held nearly constant, ca. −0.7 v. for 7 hours, decreasing only very slowly and reaching −0.59 v. after 16 hours. After interruption of the discharge, which resulted in recovery of the open circuit potential to about −0.7 v., the discharge was continued for 9 hours. On a second interruption of the discharge the open-circuit potential again returned to about −0.7 v. The discharge was continued for a further 10 hours to a total discharge time of 35 hours, after which the open-circuit potential again returned to about −0.7 v., as described hereinbelow.

TABLE I.—POTENTIAL BEHAVIOR OF ELECTRODES CONTAINING ADAMS' PLATINUM CATALYST WHEN HELIUM, PROPANE, PROPYLENE AND HYDROGEN ARE PASSED OVER THEM

| Example | Order of Gases | Degree of Electrode Reduction, Percent | Change of OCP During Flushing | | Potential Change During Discharge at 0.8 ma., (v.) | Highest OCP During Flushing with $H_2$ (v.) |
|---|---|---|---|---|---|---|
| | | | With He for 20 min., (v.) [a] | With $C_3H_6$ (v.) | | |
| I | Helium, Propylene, Hydrogen | 50 | −0.478<br>−0.418 | −0.726 (6.9 hr.)<br>Steady | −0.712 (30 sec.)<br>−0.412 (1 hr.) | −0.905 |
| II | do | 71 | −0.503<br>−0.423 | −0.762 (11 hr.)<br>−0.785 (6 hr.) [c]<br>−0.730 (1 hr.) [d]<br>Steady | −0.715 (1 min.)<br>−0.360 (1 hr.) | −0.892 |
| III | do | 90 | −0.487<br>−0.495<br>−0.483 | −0.694 (1 hr.) | −0.699 (30 sec.)<br>−0.710 (30 min.)<br>−0.700 (1 hr.) | −0.934 |
| IV | do | 90 | −0.374<br>−0.401 | −0.762 (3 hr.) [c]<br>−0.760 (1 hr.) [d]<br>Steady | −0.746 (30 sec.)<br>−0.594 (1 hr.) | |
| V | do | 90 | −0.655<br>−0.524 | −0.537 (20 min.)<br>Not yet steady | −0.527 (1 min.)<br>−0.611 (69 min., max.)<br>−0.336 (4 hr.)<br>−0.309 (6.7 hr.) | |
| VI | do | 90 | −0.351<br>−0.428 | −0.801 (4.5 hr.)<br>−0.796 (20 min.)<br>Not yet steady | −0.789 (1 min.)<br>−0.710 (1 hr.)<br>−0.500 (4 hr.)<br>−0.437 (6.7 hr.) | |
| VII | do | 95 | −0.659<br>−0.602 | −0.795 (3.4 hr.)<br>Steady<br>−0.807 | −0.802 (10 sec.)<br>−0.545 (1 hr.) | −0.928<br>−0.930 |
| VIII | do | 95 | −0.425<br>−0.602 | −0.753 (6.7 hr.)<br>−0.740 | −0.722 (2 min.)<br>−0.717 (1 hr.)<br>−0.590 (16 hr.) | |
| IX | do | 93 | −0.481<br>−0.450 | −0.920 (by $H_2$)<br>−0.804 (5.4 hr.)<br>Steady | −0.796 (30 sec.)<br>−0.680 (1 hr.) | |

[a] Values given in the upper and lower lines indicate the initial and final potentials, respectively.

[c] As shown in Figure 2, flushing was carried on for 6.4 hr. During continuous contact between electrode and electrolyte, and then under intermittent contact between the two (contact was made only at the times of potential measurement) for 4.6 hr., when the potential reached a steady value of −0.762 v. On the next day, flushing was continued with intermittent contact for 6 hr., when the potential reached a higher steady value of −0.785 v. After that, flushing was continued under continuous contact for 1 hr., when the potential reached a new steady value of −0.731 v.

[d] As explained in this footnote (c), a value of potential indicates a potential observed under a continuous contact between electrode and electrolyte. The time described in parenthesis indicates the length of flushing time after an intermittent contact is replaced by a continuous contact.

The electrode used in Example VIII which exhibited excellent discharge behavior, the capacity of which was far beyond that of the pre-adsorbed hydrogen, was used for accurately measuring open-circuit potentials over the the temperature range of 20° to 80° C.

The potential recovery phenomenon was examined at 89° and 40° C. relative to the time necessary for reaching a steady potential and other influencing factors.

Propylene was flushed through the electrode, using both intermittent contact of electrode and electrolyte and continuous contact.

The reproducibility of the data was quite good at both 80° and 40° C. After the electrode had been flushed for nearly 20 hours, necessary for reaching steady potential (−0.77 v. at 80° C.; and −0.70 v. at 40° C.), the potential decreased markedly on flushing under continuous contact (−0.68 v. at 80°; and −0.62 v. at 40°). One of the probable reasons for this decrease is the contamination of the batch charge of KOH electrolyte with discharge products. Consequently, the electrolyte was replaced at intervals. The electrolyte present in the cell-insertion tube of the discharge cell was lowered as much as possible by control of the propylene pressure, causing separation of the electrolyte from the electrode. Three-fourths of the electrolyte contained in the discharge cell could be taken out by use of a pipet temporarily inserted under the protecting mineral oil layer. The same volume of the fresh and preflushed electrolyte was introduced into the cell. This exchange procedure was repeated five times The electrolyte contained in the cell was presaturated by bubbling propylene for 20 min. without contact between the electrolyte, and then for 10 min. after the contact between the two, in order to remove the old electrolyte contained in the electrode. The entire electrolyte exchange procedure was twice repeated.

Figure 3:
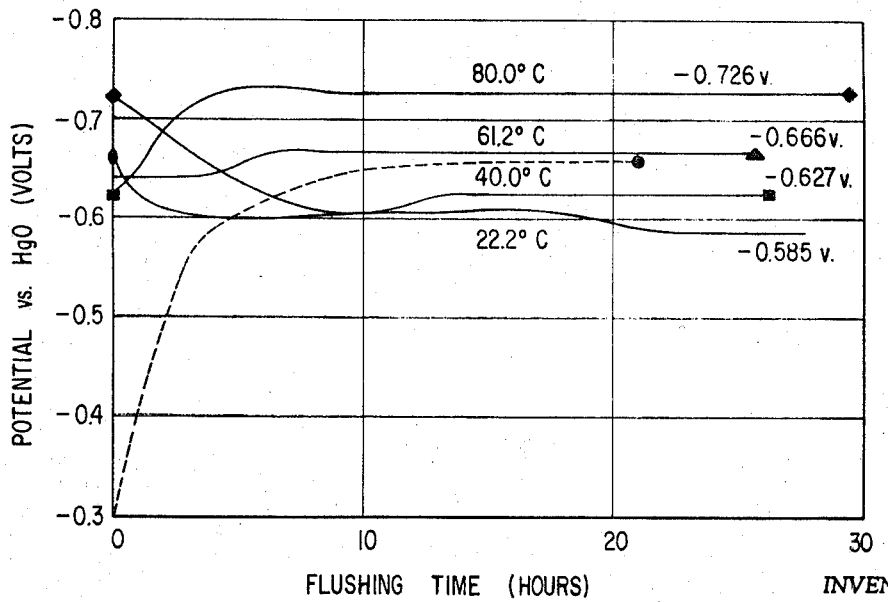
FIGURE 3 is a graph of flushing time versus potential of the electrode versus an HgO reference electrode.

As shown in FIGURE 3, a steady potential of −0.661 v. at 60° C. was obtained after flushing for about 20 hours under the intermittent contact (dotted line). On subsequent flushing for about 25 hours under continuous contact (solid line), a stead potential of −0.661 v. was observed at 61.2° C. The propylene flushing involved passing 4 bubbles per second through the electrode at a pressure of 4 mm. dibutylphthalate higher than 1 atm. without interruption of the propylene flushing, the temperature was lowered to 40° in 10 min. The potential measurement was continued; a steady potential of −0.627 v. was reached at 40° C. after 25.5 hour. Subsequent potential measurements at 80° and at 22.2° C. were made without interruption of the propylene flushing; steady potentials were observed of −0.726 v. at 80.0° C. (30.5 hour) and −0.585 v. at 22.2° C. (25.5 hour). The potentials are approximately linearly related to temperature, exhibiting a temperature coefficient of 233 mv. per degree centigrade.

Example X

The electrodes of Examples I to IX can, for instance, be used in fuel cells employing the following fuels: hydrogen, methane, propane and methanol.

Example XI

The electrodes of Examples I to IX can, for instance, be used in fuel cells operating at temperatures from 100° to above 300° C.

Example XII

The electrodes of Examples I to IX can, for instance, be used in fuel cells employing the following electrolytes: sodium hydroxide, sulfuric acid and phosphoric acid.

It is claimed:

1. A process for the preparation of a fuel electrode for a fuel cell comprising intimately mixing platinum oxide and silver powder in a weight ratio of from about 0.1 to 5:1, pressing the mixture between two silver screens to form an electrode body and reducing the body to a stage of reduction between about 50% and 95% relative to the stoichiometrically calculated stage wherein the theoretical value for the formation of PtH is 125.2%.

2. The process of claim 1 wherein platinum oxide and silver powder are mixed in a weight ratio of from about 0.25 to 1:1, and pressed between two silver screens from about 300 to 10 mesh to form a disc, said disc containing from about 100 to 1,000 mg. platinum oxide per cubic centimeter.

3. The proces of claim 2 further including impregnating the reduced disc with a water-proofing agent.

4. The process of claim 2 wherein said screens are of about 100 to 20 mesh.

5. The process of claim 2 wherein said disc is reduced to form about 70% to 90% relative to the stoichiometrically calculated stage.

6. The process of claim 2 wherein the platinum oxide is $PtO_2 \cdot H_2O$.

References Cited

UNITED STATES PATENTS

| | | | |
|---|---|---|---|
| 2,980,749 | 4/1961 | Broers | 136—86 |
| 3,020,327 | 2/1962 | Ruetsch | 136—120 |
| 3,120,457 | 2/1964 | Duddy | 136—120 |
| 3,160,527 | 12/1964 | Hess | 136—86 |
| 3,212,930 | 10/1965 | Thompson et al. | 136—120 |
| 2,849,519 | 8/1958 | Freas et al. | 136—86 |

WINSTON A. DOUGLAS, Primary Examiner

A. SKAPARS, Assistant Examiner

U.S. Cl. X.R.

264—111